United States Patent [19]

Stieg

[11] Patent Number: 4,462,271
[45] Date of Patent: Jul. 31, 1984

[54] AUTOMATIC DIFFERENTIAL CONTROL APPARATUS

[75] Inventor: Robert W. Stieg, Bethlehem, Pa.

[73] Assignee: Mack Trucks, Inc., Allentown, Pa.

[21] Appl. No.: 232,362

[22] Filed: Feb. 6, 1981

Related U.S. Application Data

[62] Division of Ser. No. 963,284, Nov. 24, 1978, Pat. No. 4,280,583.

[51] Int. Cl.³ .................... F16H 1/44; B60K 17/34; F16D 47/04
[52] U.S. Cl. ..................... 74/711; 74/710.5; 74/714; 74/665 GA; 180/250; 192/48.6; 192/47
[58] Field of Search ............ 192/46, 108, 30 W, 3.57, 192/47, 48.6; 180/248, 250; 74/710, 752 C, 710.5, 711, 714, 695, 700, 701, 665 GA

[56] References Cited

U.S. PATENT DOCUMENTS

| | | | |
|---|---|---|---|
| 1,836,773 | 12/1931 | Salerni | 192/48.6 |
| 2,049,126 | 7/1936 | Maybach | 192/108 |
| 2,228,581 | 1/1941 | Olen | 180/250 X |
| 2,699,852 | 1/1955 | Cost | 192/46 |
| 2,796,941 | 6/1957 | Hill | 192/36 X |
| 2,802,554 | 8/1957 | Pringle | 74/665 GA X |
| 2,969,134 | 1/1961 | Wiedmann et al. | 192/108 X |
| 3,349,860 | 10/1967 | Ross | 74/710.5 X |
| 3,365,035 | 1/1968 | Kress | 192/3.57 X |
| 3,368,638 | 2/1968 | Terry et al. | 74/710.5 |
| 3,378,093 | 4/1968 | Hill | 74/714 X |
| 3,400,777 | 9/1968 | Hill | 74/665 T |
| 3,403,742 | 10/1968 | Stieg | 74/714 X |
| 3,420,121 | 1/1969 | Stieg | 74/714 |
| 3,433,319 | 3/1969 | McLean | 180/250 |
| 3,505,904 | 4/1970 | Williams, Jr. | 74/710 X |
| 3,651,907 | 3/1972 | Myers, Sr. | 192/108 X |
| 3,827,520 | 8/1974 | Mueller | 180/249 X |
| 3,845,671 | 11/1974 | Sharp et al. | 74/711 X |
| 3,901,092 | 8/1975 | Romick | 74/711 |
| 4,046,210 | 9/1977 | Nelson | 74/710 X |
| 4,280,583 | 7/1981 | Stieg | 180/250 |

FOREIGN PATENT DOCUMENTS

| | | | |
|---|---|---|---|
| 121796 | 8/1946 | Australia | 180/250 |
| 0364374 | 11/1922 | Fed. Rep. of Germany | 192/108 |
| 12-10955 | 8/1937 | Japan | 192/108 |
| 77485 | 2/1955 | Netherlands | 192/108 |
| 395293 | 7/1933 | United Kingdom | 192/67 |

Primary Examiner—Allan D. Herrmann
Assistant Examiner—Joseph M. Rolnicki
Attorney, Agent, or Firm—Bernard, Rothwell & Brown

[57] ABSTRACT

A multi-position positive clutch is disclosed for use with a between-front-and-rear axle (center) differential of a multiple drive axle vehicle. One clutch member is biased to an overrun position by a fork slideably biased on a piston shaft from a main piston which, when operated, moves to bias the one clutch member in an engaged position. An annular piston, slideable on the shaft, responds to vehicle fluid brake pressure above a predetermined minimum to disengage the clutch. Clutch teeth have a dovetail shape for camming the clutch plate into engagement whereupon switch means are operated to indicate the locked position as well as opposite rotation in the overrun position.

7 Claims, 8 Drawing Figures

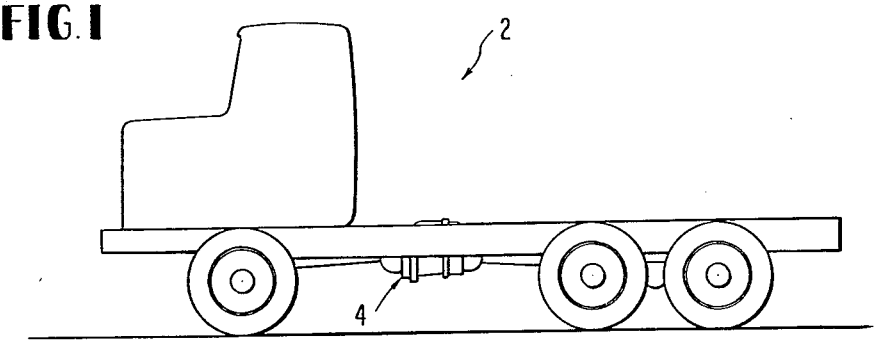
FIG.1
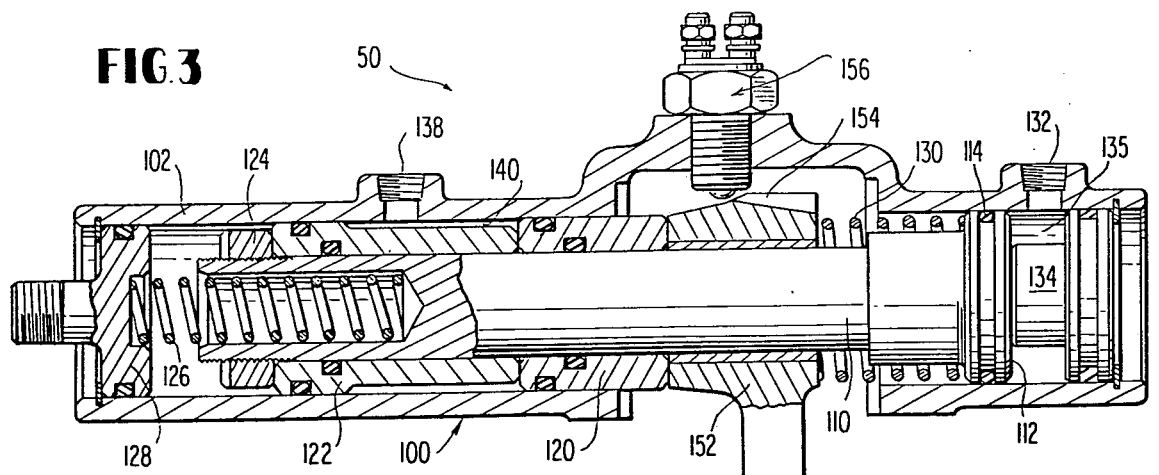
FIG.3
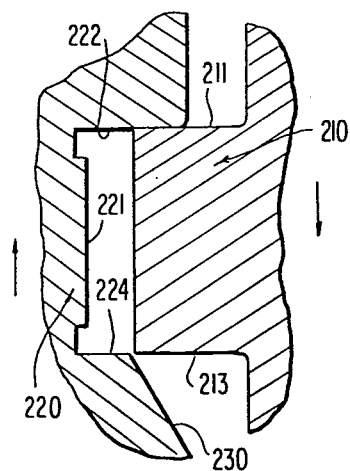
FIG.4
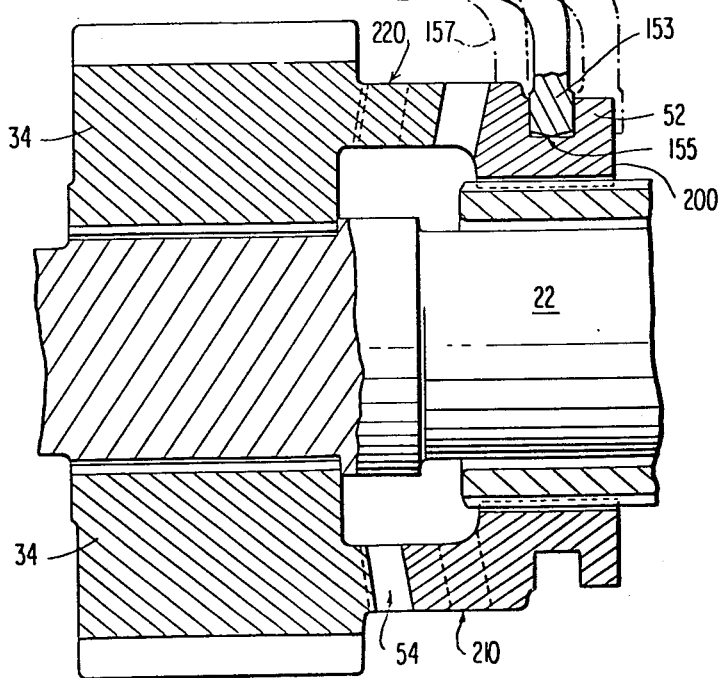

AUTOMATIC DIFFERENTIAL CONTROL APPARATUS

This is a division of application Ser. No. 963,284 filed Nov. 24, 1978, now U.S. Pat. No. 4,280,583, issued July 28, 1981.

BACKGROUND OF THE INVENTION

This invention relates to multiple drive axle land vehicles having a center differential between front and rear drive axles. In particular, the invention provides a novel three-position clutch mechanism for use with a fluid-operated bidirectional power means for transferring the clutch to an engaged or disengaged position from an intermediate, overrun position.

Heavy duty vehicles, such as six-wheel (three axle) drive truck tractors or the like are frequently provided with a power train which transfers driving power from a single power source to two or more axles. A center differential drive means may be employed for transferring the input power to the rear and front axles proportionately, the selected ratio depending upon static load distribution and anticipated dynamic distribution changes. The purpose of a center differential system is to compensate for rotational variations between front and rear axles and to avoid high drive train windup stresses which would otherwise occur.

Some prior vehicle drive assemblies have a central transfer case with front and rear output shafts which are differentially driven from a common input shaft. However, it is recognized that an unrestricted center differential drive system has a peak traction disadvantage when a substantial vehicle weight shift occurs that differs in ratio from the designated predetermined ratio. Similarly, traction problems can occur with a large road surface coefficient difference between front and rear axles. Chassis weight shift to the rear, such as automatically occurs when climbing a grade or towing a trailer load is another common condition. In this situation, the maximum vehicle drawbar pull will be prematurely limited because of a reduced reactive force on the front output of the center differential, and consequently, the front axle may spin out on the road surface prior to the rear.

To overcome the spinout condition which results from an unrestricted center differential, a common expedient has been to add a positive jaw clutch lock to temporarily eliminate differential action. Such a lock can be actuated by the driver or by automatic speed-sensitive controls. A disadvantage of this type of jaw clutch lock is that excessive use on high traction surfaces imposes driveline windup torques that can be additive to the normal drive torques, thereby reducing axle gear life. An improperly-trained operator may lock the center differential while climbing steep high-traction road surface grades with a fully loaded truck. Although this lock-up procedure assures that the vehicle will not spin out and come to a halt midgrade because of torque or surface variations, it results in severe wear which accompanies the extra torque strain.

Another device used to overcome vehicle center differential spinout is an overrunning clutch between the input and one or both of the differential outputs as disclosed in U.S. Pat. Nos. 2,796,941, 3,378,093, and 3,400,777 to Hill and 3,901,092 to Romick. Gear ratios and tire sizes are adjusted on the clutch output drive trains to the wheels so that the clutch overruns when the tires are not slipping. However, with tire slippage, lock-up occurs beyond a specified amount of differential output overrun. One disadvantage of the positive type of overrunning clutch, as used with a center differential and a "fast front" ratio match, is that excessive drive train torques can be imposed during panic brake stops by a transfer of rear brake torque to the front axle. During extreme deceleration, the rear axle tends to slow faster than the front, causing the overruning clutch to reverse direction, and the rear brakes retard the front wheels. Attempts to limit the peak front drive torque in this situation are illustrated in U.S. patents to Hill, U.S. Pat. No. 3,400,777 and U.S. Pat. No. 3,378,093 which disclose complex and costly friction disc, non-positive locks that apply differential braking on front axle overrun. A different attempt to correct the problem is illustrated in U.S. Pat. No. 3,901,092 to Romick, which discloses a completely separate friction-type, torque-limiting clutch in the front drive shaft. In addition to the cost, this latter system has the further disadvantage of forcing constant slippage and wear of the friction-type, torque-limiting clutch when in differential lockup, due to the planned ratio difference between front and rear axles to freewheel the overrunning clutch. My invention automatically disengages the overruning clutch during moderate-to-heavy braking, and thereby eliminates the problem.

SUMMARY OF THE INVENTION

Generally the present invention relates to a center differential and related system for overcoming many of the problems mentioned above, among others, which have characterized such systems in the past. In a multi-axle vehicle having at last a front axle and a rear axle, means are provided for driving these axles through a front shaft connected to the front axle and a rear shaft connected to the rear axle. The front and rear shafts are connected to each other through a differential means for allowing relative rotation. A clutch means is integrated with the front and rear shafts for locking out the differential upon a predetermined rotation of said front shaft relative to said rear shaft.

More specifically, the invention includes a novel fluidactuated clutch device for selectively locking an interaxle differential in response to vehicle deceleration and/or manual application of pressurized fluid. The device comprises a three-position, positive jaw clutch for locking, including a first set of male clutch teeth; a secod set of coacting female clutch teeth having surfaces mating with said first set; and shifting means, e.g., a slidable shift fork, for moving these sets of clutch teeth axially to a full-engaged position, an intermediate overrun position, and a disengaged position.

The second set of female clutch teeth is configured, e.g., partially beveled, on one surface to permit differential movement of the first and second sets of clutch teeth by slippage of the first set of male teeth against this surface of the second set of female teeth to permit unidirectional overrun in a first relative rotational direction, while locking the differential in a second relative rotational direction. A spring-biased, fluid motor, such as a pneumatic piston, is operatively connected to a shifting means, e.g. a fork, and retains the shifting means in an intermediate position when unactuated. The fluid motor is bi-directionally movable by application of fluid pressure.

The clutch may be disengaged when pressure is applied to the fluid piston in the first direction. This actuating pressure is associated with the vehicle front brakes, and movement may be initiated for disengagement at a predetermined pressure, which occurs under moderate or greater braking conditions.

Preferably, the first set of female clutch teeth have sliding surfaces, permitting axial movement in a direction transverse to their rotational plane, with one of these sliding surfaces being fully mated with the opposing male surface and angularly disposed to engage the male surface in the nonoverrun second relative rotational direction. The opposite sliding surface of the female tooth has a partial sliding surface for mating with the opposing male surface when the clutch is in the fully-engaged position and a partially beveled surface to engage the male surface in the overrun rotational direction.

The fluid motor or clutch position transfer power means can operate on the available vehicle brake fluid pressure system. Since most heavy-duty land vehicles employ compressed air as the source of brake fluid pressure, the preferred embodiments of this invention will refer to pneumatic actuating fluid power means; however, it is understood that other fluid pressure devices, such as hydraulic pistons, can be employed to operate the jaw clutch assembly.

The improved center differential locking clutch apparatus is particularly useful in three axle 6×6 vehicles having all-wheel drive and air brakes, and the invention is described by reference to a three axle vehicle (one front and two rear) with front and rear drive from a single power shaft. In one of the preferred embodiments, the jaw clutch has dovetail clutch teeth, which, under torque load, function to move the clutch from the intermediate overrun position to the engaged position under certain conditions of faulty vehicle axle-tire ratio matching, or as a result of a failed front axial drive member. An electrical switch may be incorporated in the apparatus to sense the engaged position, and it will also serve to warn the operator of these fault conditions if the signal comes on without driver actuation.

In addition, the clutch cooperates with the "fast front" ratio match to facilitate disengagement of the clutch from the engaged position. After the clutch has been moved into the engaged position it may tend to remain there because of opposing forces on the teeth creating frictional forces that impede release to the intermediate position which otherwise would occur. When the vehicle makes a turn, however, the effect on the clutch will be a change in the relative rotation between the male and female clutch teeth and consequently, a reduction of the frictional forces that impede the release. This system provides an automatic release mechanism to insure the clutch reverts to the normal intermediate position from the engaged position.

BRIEF DESCRIPTION OF THE DRAWING

FIG. 1 is a side view of a multi-axle truck having a transfer case.

FIG. 3 is a partial blowup of the three-position clutch and an actuating mechanism shown in FIG. 2.

FIG. 4 is a cross-section of the clutch teeth in partially-engaged position.

FIGS. 6b and 6c are perspective views of the clutch teeth shown in FIG. 6a.

DETAILED DESCRIPTION OF THE PREFERRED EMBODIMENT

In FIG. 1 there is shown an example of a type of multi-axle truck 2, having a transfer case 4 which incorporates the features of the invention. As can be seen, the transfer case 4 is located between the front and two rear axles to deliver torque to the front and rear axles proportionately at a predetermined ratio which is a function of the static and dynamic loads expected for each axle. In this preferred embodiment, a "fast front" or numerically smaller front ratio of about ½ to 6 percent can be employed whereby the front differential output shaft under normal conditions of no wheel slippage rotates at a speed less than that of the rear output shaft. This is accomplished through the axle-tire ratio selection and the axle differential integrated with the tire size chosen. Details of the elements comprising the invention will be described hereinafter in connection with FIGS. 2, 3, 4, and 5.

Figure 2:
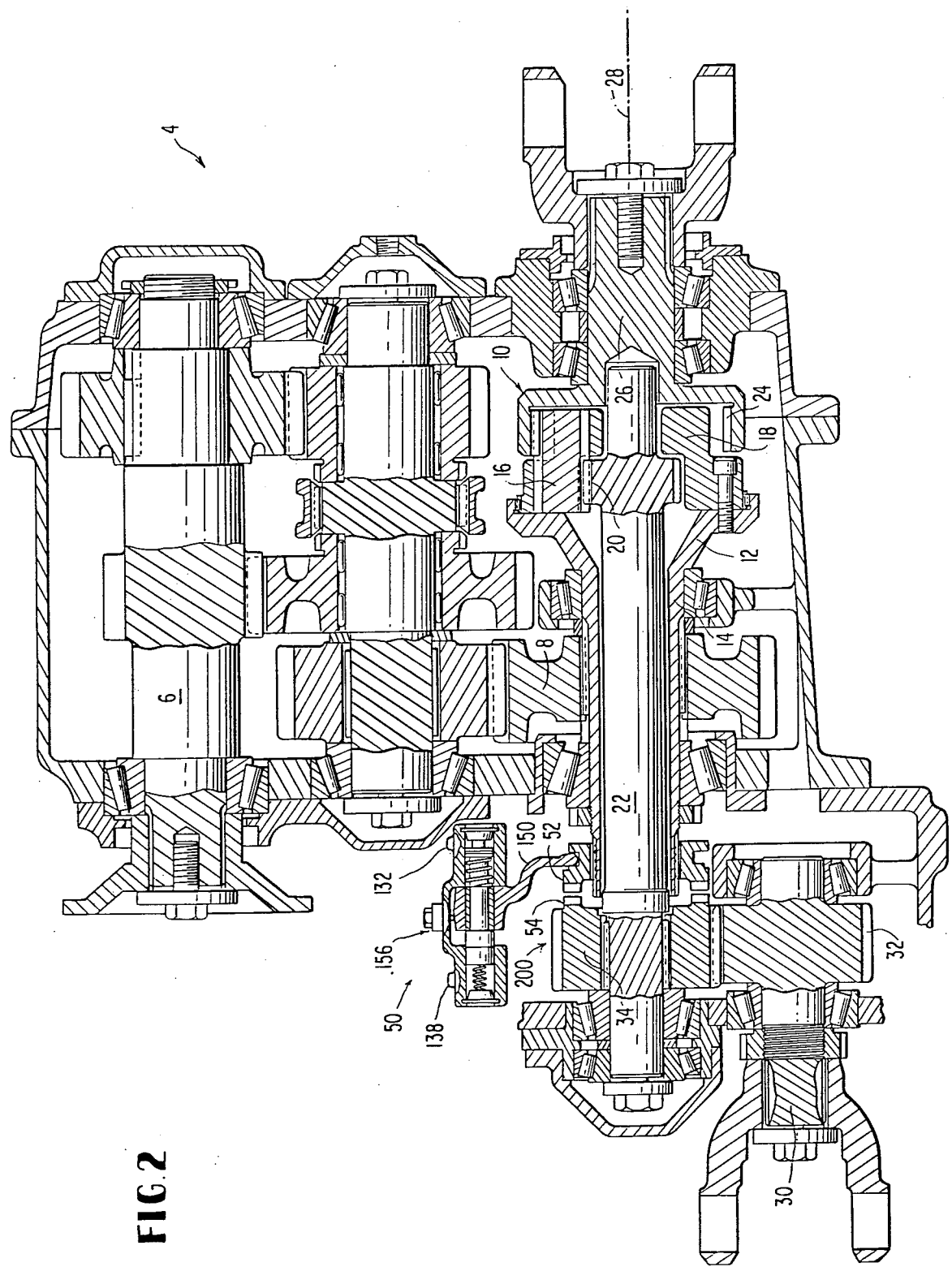
FIG. 2 is a cross-section of the transfer case.

Referring to FIG. 2, power to the transfer case 4 is delivered from the truck engine to main shaft 6 and through a gear reduction system to drive gear 8. The differential 10 includes a housing 12 connected to hollow rotating shaft 14 on which drive gear 8 is splined. The differential is a planetary type, for instance that shown in U.S. Pat. No. 3,792,628 to Stieg, with planetary gears 16 carried within gear cage 18 secured to the housing 12. The planetary gears 16 coact with sun gear 20 on front shaft 22 and ring gear 24 on output rear drive shaft 26 to allow for relative rotational movement between the shafts 22, 26. The shafts 22, 26, and 14 have a common axis 28 with front shaft 22 rotating within hollow shaft 14 as shown. Output front drive shaft 30 carries a front drive lower gear 32 which is driven by front drive upper gear 34 secured to front shaft 22. The three-position clutch mechanism of the present invention, indicated generally as 50 in FIG. 2, and its accompanying control system will be described in greater detail below in connection with the above elements and with reference to FIGS. 3 to 6c.

As can be seen in FIG. 2, the clutch mechanism 50 is located on the transfer case adjacent gear 34. Included in clutch assembly 50 is a shifting male element 52 splined onto the outer surface of hollow shaft 14 in a manner which provides for relative axial movement. In the rotational direction, however, the male element 52 is fixed to shaft 14 to rotate therewith. In contrast, the upper gear 34 is fixed to shaft 22 in both the axial and rotational directions. Depending on the type of engagement or disengagement of the male element 52 with the female element 54 of the upper gear 34, the differential effect of the differential 10 may be locked out. In the operation of the clutch, the male element 52 as designed will be more fully explained hereinafter.

With the "fast front" system and the gear ratio employed, the front differential output shaft 22 under normal conditions rotates at a speed less than that of the rear differential output shaft 26. Consequently, there is relative rotation of the male and female elements 52, 54. In this normal condition, the male and female elements are maintained in an intermediate disposition of engagement where there is an overrunning, ratcheting effect of the male element 52 sliding over surfaces of the female element 54. But when the front wheels "spin out", the front differential shaft 22 will then be rotating faster than the shaft 26, thus reversing the relative rotation. Upon reversal, the male and female elements 52, 54 lock, resulting in the shafts 22 and 26 being fixed relative to each other and thereby locking out the effect of differential 10. Consequently, "spinout" will cease, because the front shaft 22 will have to rotate at the same speed as rear shaft 26.

Reversal of the relative rotation between shafts 22, 26 is not always a result of front wheel "spinout". Where there is quick or panic braking, the rear wheels will typically slow faster than the front wheels. Without some compensating mechanism, slowing of rear output shaft 26 due to braking would be transferred through differential 10 to corresponding slowing of rotation of shaft 14 relative to front output shaft 22. As with the "spinout" situation discussed above, this will cause the male and female elements 52, 54 to lock, thus locking out the differential 10 and retarding the front axle as a result of the transfer of rear brake torque shafts 26 and 22 to the front axle. This causes, among other things, excessive driveline torque with its concomitant severe wear. In this preferred embodiment, the clutch system employs a means for automatically disengaging the male and female elements 52, 54 during "panic brake" situations to insure full differential action and avoid the deleterious effects of excessive drive-line torque. This is explained more fully in connection with the fluid motor 100 below.

Referring to FIG. 3, the bi-directional fluid motor 100 is shown, comprising a pneumatic cylinder housing 102, adapted for mounting on jaw clutch assembly 200. A dual fluid piston means is provided, including a main rail piston 110, having a terminal portion 112 adapted for sliding operation within cylinder housing 102, and provided with O-ring seal 114. Clutch fork, 150 is slidably mounted on rail piston 110 and abuts rear concentric piston member 120 by pressure from helical spring 130. Hub sleeve portion 152 of fork 150 is concentrically mounted on rail piston 110 for relative sliding movement during clutch overrun, and travel between the intermediate position and the disengaged position. Front concentric member 122 transmits force from rail piston 110 through end nut 124. A prestressed helical spring 126 retained between the end of front plug 128 and a recess in the end rail piston 110, urges the piston rearwardly against rear plug 134, as required for the overrunning and the disengaged clutch positions. A spring force is maintained between the fork member 150 and the terminal portion or face 112 of rail piston 110 by helical spring 130 to return the overrunning clutch after each tooth ratcheting. Bottom portion 153 of fork 150 is slidably positioned in groove 155 of clucth 52 to provide for axial movement of clutch 52 with fork 150 while allowing rotation movement of clutch 52 relative to the fork 150. Thus, when the trunk is under normal conditions, the male element clutch cyclically moves back and forth along the splined surface of shaft 14 as can be seen in FIG. 3. Correspondingly, the fork member moves between the position shown in solid lines and that shown by phantom lines 151. When front axle "spinout" occurs, the fork member 150 will remain substantially in the position shown in solid lines, because the male and female elements 52, 54 will be locked together.

There are occasions when the ratcheting or overrunning at the intermediate position is undesirable and differential lockout is required. In this situation, the fluid motor 100 is actuated to move the fork 150 to the fully engaged position shown by phantom lines 157 in FIG. 3.

Figure 5:
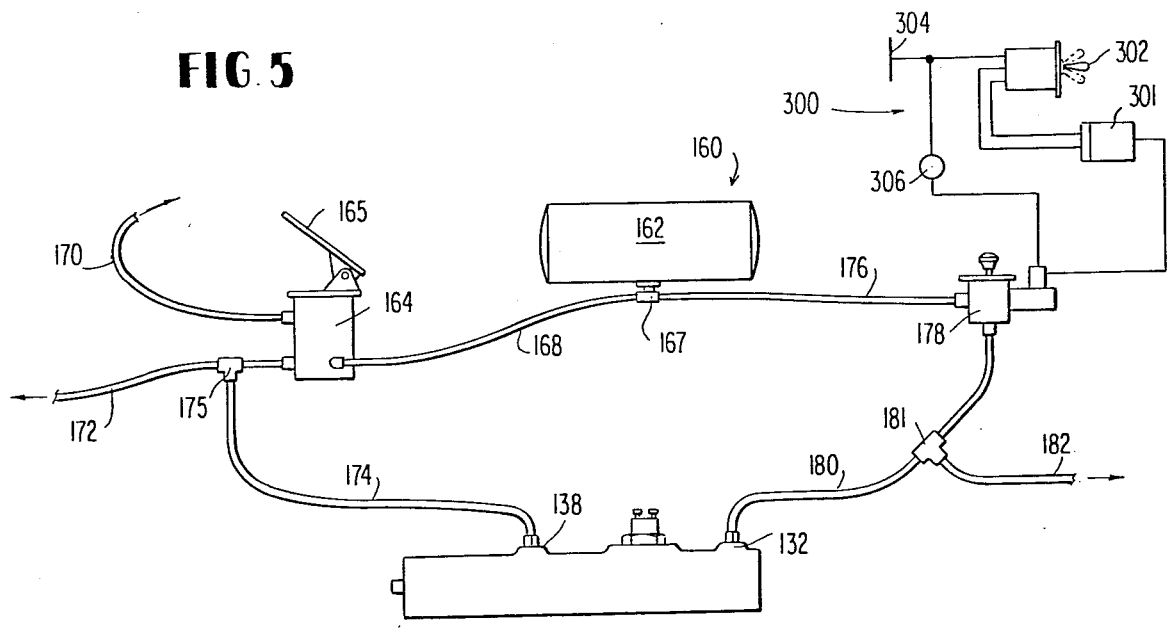
FIG. 5 is a schematic of the control system for operating the actuating system.

Although the fluid motor device is normally held in an unactuated position by springs 126 and 130, the main rail piston member 110 is moved to the forward position, associated with the full engagement of the jaw clutch, by application of compressed air to the rear surface of piston 110 through actuation of, for instance, manually-controlled means as shown in FIG. 5. The air enters air supply port 132 adjacent rear plug 134, which has an annular recess 135 to admit air. Port 132 is connected to the vehicle air source through one or more valves. As the result of this air-actuation, the fork member 150 travels to the forward position, and hub extension portion 154 contacts electrical detent switch 156, which is connected electrically to a signal light in the operator's compartment to indicate the fully engaged condition of the differential lock. Upon release of air pressure at the rear face 12 of main piston 110, the force of spring 126 returns the fork member to its normal intermediate position.

The operation of the pneumatic fluid motor 100 under severe braking conditions differs from that of the manual lockup in several aspects. At a predetermined braking pressure (e.g. about 30 pounds per square inch or greater up to full "panic" braking), air is introduced through air supply port 138 to annular recess 140 between front concentric member 122 and rear concentric piston member 120. The spring-biased piston means remains in the mid position until a predetermined fluid pressure is exceeded, as occurs upon moderate to full operation of air brakes.

When the predetermined bias force of spring member 130 is overcome by the air pressure, the rear concentric piston member 120 moves toward fork member 150 rearwardly, exposing the piston face to high pressure air. This provides a rapid movement of the fork member to disengage the jaw clutch. The reduction of braking air pressure at port 138 permits spring 130 to return the fork to its intermediate overrun position.

In FIG. 5, a schematic of the system for providing air to the fluid motor 100 is shown. This schematic system 160 includes an air reservoir 162 which provides a source of pressurized air for the overrunning clutch control system under predetermined conditions as is explained above. A first air line 168 connects a brake valve actuator 164 to the reservoir 162 at T-juncture 167. Rear brake line 170 and front brake line 172 are connected to a conventional or other braking system for the vehicle wheels. On the front brake line 172, there is provided a T-joint 175 from which a branch 174 is connected to the air supply port 138 of the fluid motor 100. A brake pedal 165 is integrated with valves within the actuator to supply pressurized air from the reservoir, upon depressing the pedal, to the front and rear brake lines 170, 172. In this way, when brake pedal 165 is depressed to a position where the braking pressure exceeds 30 pounds per square inch, the pressurized air will be drawn from the front brake line and delivered to the fluid motor to move the clutch to the rearward, third or disengaged position.

Another branch line 176 has one end connected to the air reservoir 162 at T-joint 167 with the other end being connected to a differential override lock valve 178 which in turn is connected to the air supply port 132 by line 180. In this way, the operator may override the automatic features of the system to force the clutch teeth into a fully engaged or forward position thereby eliminating the differential action which would otherwise occur. This differential lock valve 178 includes a spring return and a timer (approx. 2 Min.) control to automatically close the valve after a predetermined period of time so that the manual override will automatically release. A yellow warning light is provided in the cab and integrated with a conventional circuit which is actuated when the clutch is in the manual override mode by engagement of the switch 156 as explained above. In this manner, the operator is warned when the clutch is in the fully engaged position by the yellow light being illuminated. A branch air line 182 can be connected to line 180 at T-joint 181 as shown in FIG. 5 to override a tandem interaxle differential lock (not shown) by actuation of valve 178.

A schematic of electrical system 300 employed in conjunction with the differential lock valve 178 is shown in FIG. 5. The valve 178 is operated by an elctric solenoid having one terminal connected to a two minute solid state timer and relay 301 which is in turn connected to a three position switch 302. For providing power to the system, an electric power source 304, which in this embodiment is the ignition, is connected to both the three position switch 302 and the other terminal of the electric solenoid. In the line connecting the power source 304 with the other terminal of the electric solenoid there is included a transmission switch 306 to actuate automatically the solenoid and lock the differential when the transmission is moved into reverse. The spring return three-position switch 302 is moveable between a normal intermediate switch off position, an upper immediate clutch release position and a lower 2 minute timed clutch lock position as shown by the phantom lines. This system gives the operator some versatility in choosing the most desireable mode of operation depending on the circumstances.

The functioning of the jaw clutch device 200 will be described with reference to FIGS. 3 and 4. The fluid motor 100 is integrated, as explained above, with fork member 150 which is operatively connected to moving male element 52 axially between three positions—engaged, intermediate, and disengaged. This male clutch element 52 is a rotary jaw-type device having a plurality of male clutch teeth 210 arranged in an equally-spaced pattern around a circular jaw face. Male clutch teeth have opposite surfaces 211 and 213. A set of coacting recessed female clutch teeth 220 is provided on female element 54 for receiving rotary force from clutch teeth 210. Each of recessed female clutch teeth has a first surface 222 extending from jaw face 221 outwardly and providing, axially-sliding surface, essentially coextensive with the mating surface 211 of male tooth 210. The rotary force is transmitted from clutch element 52 to gear 34 when teeth 210 and 220 are in the fully engaged positions. This force is transmitted along mating surfaces 211 and 222. An opposite female tooth surface 224 extends outwardly from face 221 a distance less than that of surface 222. The distance surface 224 extends is related to the movement of fork 150 when shifting from the intermediate to the fully-engaged position such that surface 224 will not engage surface 213 of male tooth 210 when the fork is in the intermediate position, but will engage surface 213 in the fully engaged position.

When the fluid motor is in the intermediate position beveled surface 230 extending from surface 224 as shown permits unidirectional overrun by clutch element 52 which engages surface 230 with the corner of tooth 210 at surface 213 thereby deflecting tooth 213 and clutch element 52 outwardly or towards disengagement. The angle of incidence of beveled surface 230 may be varied according to clutch design and tooth configuration. Also the clutch tooth contact surfaces may be generated to retain line contact, rather than point contact, during all angular positions of clutch overrun.

The foregoing tooth configuration achieves the desired effect on the differential 10 in the following manner. Under normal i.e. intermediate engaged, conditions, the teeth 210 and 220 will have a slow relative rotational movement indicated by arrows in FIG. 4. Under these conditions, the beveled surface 230 of female tooth 220 will engage the corner of surface 213 of male tooth 210 deflecting it outwardly. After passing over one female tooth 220, male tooth 210 is returned to the position shown in FIG. 4 when it moves into position opposite the next circumferentially spaced female tooth by spring 130 acting on fork 150 as explained above. The motion results in the ratcheting effect mentioned before. When the relative rotation starts to reverse, for example, as the result of spinout of the front wheels, surface 222 of the female tooth 220 engages surface 211 of male tooth 210 thereby preventing reverse relative rotation and locking out differential 10. During panic braking, the fluid motor will be actuated to move the clutch to the disengaged position which results in the male tooth 210 being moved outwardly sufficiently that it will not be engaged by any of the surfaces 222, 224, 230 of female tooth 220. On the other hand, when moved to the fully engaged position, which occurs during manual override, the male tooth 210 is moved inwardly such that both surfaces 222, 224 can engage corresponding surfaces 211, 213 on male tooth 210 to prevent relative rotation in either direction.

In FIG. 4, the surfaces 211, 213, 222, and 224 are squared in the sense that they are parallel to each other and to the axis of rotation. In an alternative embodiment, the clutch teeth can have a configuration shown in FIGS. 6a, 6b, and 6c where a dovetail type tooth is employed. It should be noted that corresponding elements in FIGS. 6a, 6b, 6c have like reference numbers for elements used in FIG. 4, except those reference numbers used in the dove tooth configuration are marked by a prime.

Figure 6A:
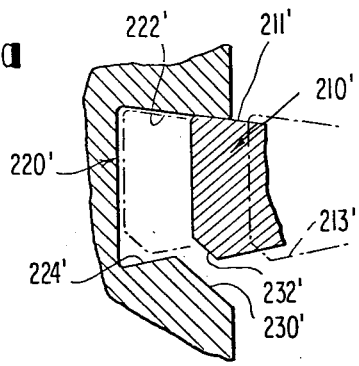
FIG. 6a shows a cross-section of an alternative embodiment of clutch teeth partially engaged.
Figure 6B:
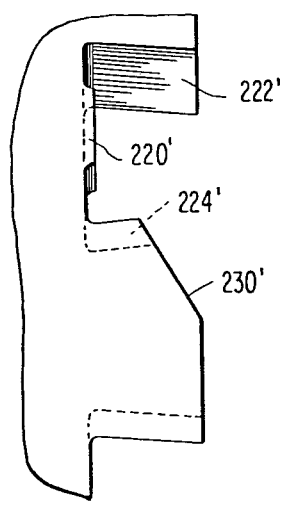
Figure 6C:
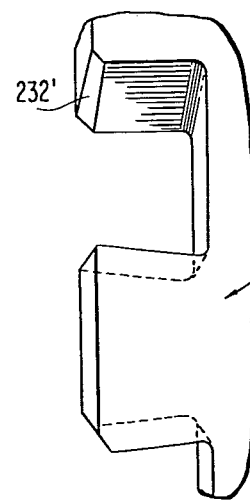

A distinction between the dovetail teeth 210', 220' and teeth 210, 220 are the surfaces 211', 222', 213', 224', which are angled to the axis of rotation. As can be seen in FIG. 6a, surfaces 211' and 213' slope away from each other toward the top of the tooth 210'. Similarly, surfaces 222' and 224' of female tooth 220' are parallel respectively to surfaces 211' and 213' of male tooth 210'.

In addition, the male tooth 210' has a complementary beveled surface 232' which coacts with beveled surface 230' to prevent tooth corner chipping during overrun. In the preferred embodiment, the dovetail face angle for the surfaces 222', 224' and corresponding surfaces on the male tooth 210' are about 4°.

This dovetail configuration has two principal advantages over other types of clutch teeth configurations: (1) it insures engagement retention in spite of production parts tolerance variations, and (2) it actuates a driver warning for improper "slow-front ratio matches or for front axle shaft failures. If the operator inadvertently places a smaller diameter "slow-front" tire on the front axle, the tooth engagement surface in the 222' side will pull the clutch into the fully engaged position as a result of the cam action from the pressure on the dovetail slope 222' side clutch face. This same action can also result from a front axle shaft failure. In both instances, the vehicle will continue to operate making a warning light desirable as an indication to the driver that a problem exists.

As explained above, when the male and female elements 210', 220' are in the fully engaged position, hub extension portion 154 of fork member 150 contacts electrical detent switch 156 to actuate a warning light. In the preferred embodiment, the warning light has taken the form of a continuous "light on" of the yellow light described above not only for normal manual lock-up, but also lock-up without driver actuation. However, any other convenient warning signals may be employed.

For the one very infrequent, but possible, alternative mobility situation where the rear tires could spin out prematurely in forward travel (rear wheel off ground or on isolated slippery spot, and front tires on a better traction surface), the manual override lock switch 302 provides an effective remedy. By actuating manual lock switch 302, the driver may positively lock the center differential with this spring return and timed override lock control which will move the clutch to the fully engaged position. The preferred embodiment uses an automatic timer on this engagement to positively prevent the possibility of forgetting to disengage. A short period timer (approximately 2 minutes) is practical because of the infrequent and short term need with this system, and it offers the distinct advantage over manual disengage locks of making it impossible to forget to unlock the differential lock, which would impose excessive driveline stress on high traction surfaces. As explained above, the control for the manual override lock switch 302 is from the driver, but it would also be possible to use an automatic speed sensor on the differential to sense rear wheel spinout, and to automatically shift to the fully engaged position for a timed interval.

The "fast front" ratio match and the resultant direction of overrunning clutch motion, which also prevents separate front axle spinout, is by far the more frequent vehicle spinout occurence than rear axle spinout. Front spinout tends to occur on grades or when towing heavy loads. Also, the "fast front" system, when in fully engaged position, causes the driveline torque windup to reverse direction when the vehicle turns a corner. For example, when the manual override lock switch 302 is activated, the fluid motor will move the male tooth 210 into full engagement with female tooth 220 thereby locking out the differential 10. But even after the fluid motor is deactivated to release the male tooth 210, the teeth may remain engaged because of the opposing forces action on surfaces 213 and 224. These opposing forces are the result of the tendency toward the relative rotational movement which otherwise would occur if these surfaces 224, 213 were not engaged. When the truck 2 makes a turn, however, the effect on shaft 22 is to increase its speed of rotation relative to clutch 200 causing female tooth 220 to approach or even surpass the rotational speed of the complementary male tooth 210. This shifting of relative rotational speed reverses the driveshaft torque windup and reduces the friction between surfaces 224 and 213 allowing the male tooth 210 to be released from the female tooth 220 under the action of spring 126 as explained above in connection with FIG. 3.

This torque reversal insures that the clutch in lockup position will always release on the first corner after override control release. The "fast front" ratio match will, therefore, circumvent the normal tendency for an engaged jaw clutch to be frictionally held by driveline torque windup.

It is claimed:

1. A positive clutch for selectively controlling relative rotation between output drive shafts which extend to separate axles from a center differential driven by an input drive shaft in a multiple-drive axle vehicle, comprising:
   a first clutch member adapted for operative connection to one of the drive shafts;
   a second clutch member adapted for operative connection to another of the drive shafts;
   said second clutch member being movable relative to said first clutch member from an overrun position to a disengaged position;
   means for normally biasing said second clutch member to the overrun position;
   said first and second clutch members being constructed to permit unidirectional differential overrun in one relative rotational direction but to lock said center differential to prevent differential rotation in the opposite relative rotational direction when said second clutch member is biased in the overrun position; and
   means responsive to a vehicle brake fluid pressure above a predetermined fluid pressure for moving said second clutch member to the disengaged position whereby said clutch members are disengaged during a panic braking stop to permit free relative rotation between the output shafts in both relative rotational directions.

2. A clutch as claimed in claim 1 wherein said biasing means includes spring means, and said moving means includes fluid motor means normally biased by the spring means to a retracted position and responsive to the vehicle brake fluid pressure above the predetermined fluid pressure for advancing the fluid motor means to an advanced position to move the second clutch member to the disengaged position.

3. A clutch as claimed in claim 1 or 2 wherein the predetermined fluid pressure is about 30 psig.

4. A clutch as claimed in claim 1 wherein the second clutch member is also movable to an engaged posion.

5. A clutch as claimed in claim 4 wherein said moving means includes cylinder means with first and second spaced coaxial cylinder portions, main piston means operable in the first cylinder portion between advanced and retracted positions and having a piston shaft extending into the second cylinder portion, annular piston means slideably carried on the piston shaft and operable in the second cylinder portion between advanced and retracted positions on the piston shaft, and clutch member moving means slideably carried on the piston shaft between the first and second cylinder portions; and
   said biasing means includes first spring means biasing the main piston means to its retracted position, and second spring means biasing the clutch member moving means against the annular piston means to bias the annular piston means to its retracted position on the piston shaft.

6. A three-position positive clutch for selectively controlling relative rotation between output drive shafts which extend to separate axles from a center differential driven by an input drive shaft in a multiple-drive axle vehicle, comprising:

first and second clutch members adapted for operative connection to respective drive shafts of said drive shafts wherein the second clutch member is movable relative to the first clutch member from an overrun position to engaged and disengaged positions, said clutch members including means for permitting unidirectional differential overrun in one relative rotational direction but locking the center differential to prevent differential rotation in the opposite relative rotational direction when in the overrun position and for locking the clutch members against relative rotation when in the engaged position;

cylinder means including first and second spaced coaxial cylinder portions;

main piston means operable in the first cylinder portion between advanced and retracted positions and including a piston shaft extending into the second cylinder portion, and means biasing the main piston means to the retracted position;

annular piston means slideably carried on the piston shaft and operable in the second cylinder portion between advanced and retracted positions on the piston shaft; and clutch member moving means slideably carried on the piston shaft between the first and second cylinder portions and including means biasing the clutch member moving means toward the annular piston means, said clutch member moving means being operatively connected to the second clutch member for positioning the second clutch member in the overrun position when both of the piston means are in their retracted positions, for positioning the second clutch member in the engaged position when a selected one of the piston means is in its advance position, and for positioning the second clutch member in the disengaged position when the other piston means is in its advanced position.

7. A clutch as claimed in claim 4, 5 or 6 wherein said clutch members include respective mating sets of dovetail teeth extending from facing portions of the clutch members; said teeth having a sloping engaging surfaces on the opposite sides of each tooth thereof for cooperating with the respective sloping engaging surfaces of the opposing teeth for producing camming forces tending to force the clutch members together when in the engaged position upon differential rotative forces in either relative rotational direction; the sloping engaging surfaces on one side of the teeth of one of the sets and the sloping engaging surfaces on the opposing sides of the teeth of the other set extending substantially to ends of the teeth for producing camming forces tending to force the clutch members together when in the overrun position upon differential rotative forces in one relative rotational direction; and the one set of teeth having beveled surfaces extending from midway on the opposite sides of the teeth of the one set to ends of the teeth of the one set for engaging the teeth of the other set to cam the clutch members apart when in the overrun position upon differential rotation in the other relative rotational direction.

* * * * *

UNITED STATES PATENT AND TRADEMARK OFFICE
CERTIFICATE OF CORRECTION

PATENT NO. : 4,462,271
DATED : July 31, 1984
INVENTOR(S) : Robert W. Stieg

It is certified that error appears in the above-identified patent and that said Letters Patent is hereby corrected as shown below:

Column 2, line 34, the word "last" should read --least--.

Column 10, line 46, "posion" should read --position--.

Column 12, line 11, delete the word "a".

Signed and Sealed this

Twenty-sixth Day of February 1985

[SEAL]

Attest:

DONALD J. QUIGG

Attesting Officer

Acting Commissioner of Patents and Trademarks